(12) United States Patent
Hong et al.

(10) Patent No.: US 12,055,892 B2
(45) Date of Patent: Aug. 6, 2024

(54) HOLOGRAPHIC DISPLAY APPARATUS, HEAD-UP DISPLAY APPARATUS, AND IMAGE PROVIDING METHOD

(71) Applicant: SAMSUNG ELECTRONICS CO., LTD., Suwon-si (KR)

(72) Inventors: Jong-Young Hong, Suwon-si (KR); Hoon Song, Yongin-si (KR); Juwon Seo, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 300 days.

(21) Appl. No.: 17/547,374

(22) Filed: Dec. 10, 2021

(65) Prior Publication Data

US 2022/0342368 A1 Oct. 27, 2022

(30) Foreign Application Priority Data

Apr. 26, 2021 (KR) ........................ 10-2021-0053760

(51) Int. Cl.
*G03H 1/22* (2006.01)
*G02B 27/00* (2006.01)
*G02B 27/01* (2006.01)

(52) U.S. Cl.
CPC ....... *G03H 1/2294* (2013.01); *G02B 27/0093* (2013.01); *G02B 27/0103* (2013.01); *G03H 1/2205* (2013.01); *G02B 2027/0174* (2013.01); *G03H 2001/221* (2013.01); *G03H 2222/12* (2013.01); *G03H 2222/16* (2013.01); *G03H 2226/05* (2013.01)

(58) Field of Classification Search
None
See application file for complete search history.

(56) References Cited

U.S. PATENT DOCUMENTS

| 9,436,159 | B2 | 9/2016 | Jung et al. |
| 10,084,990 | B2 | 9/2018 | Smits |
| 10,671,158 | B2 * | 6/2020 | Kang ................... H04N 13/376 |
| 11,187,891 | B1 * | 11/2021 | Moon ............... G02F 1/133553 |
| 11,467,535 | B2 * | 10/2022 | Seo ........................ G03H 1/2205 |
| 2004/0108971 | A1 * | 6/2004 | Waldern ............... G02B 27/017 345/8 |
| 2016/0103321 | A1 | 4/2016 | An et al. |

(Continued)

FOREIGN PATENT DOCUMENTS

| KR | 10-2018-0057294 A | 5/2018 |
| KR | 10-2176583 B1 | 11/2020 |

(Continued)

*Primary Examiner* — Fred Tzeng
(74) *Attorney, Agent, or Firm* — Sughrue Mion, PLLC

(57) ABSTRACT

A holographic display apparatus includes a backlight unit having a light source configured to emit coherent light, a spatial light modulator configured to diffract incident light from the backlight unit and generate a holographic image, a beam deflector configured to change a traveling direction of the incident light from the backlight unit to change a focal position of the holographic image, an eye-tracking sensor configured to recognize positions of a viewer's eyeballs, and a controller configured to perform, in real time, calibration of the eye-tracking sensor and the beam deflector to focus the holographic image on the recognized positions of the viewer's eyeballs.

17 Claims, 11 Drawing Sheets

(56) References Cited

U.S. PATENT DOCUMENTS

| | | | | |
|---|---|---|---|---|
| 2017/0082976 | A1* | 3/2017 | Schwerdtner | G03H 1/2294 |
| 2017/0255020 | A1* | 9/2017 | Tam | G02B 27/0172 |
| 2018/0129166 | A1* | 5/2018 | Seo | G03H 1/268 |
| 2018/0284693 | A1* | 10/2018 | Sung | H04N 13/32 |
| 2019/0271941 | A1* | 9/2019 | Sung | G03H 1/2205 |
| 2020/0400953 | A1* | 12/2020 | Hong | G02B 27/0172 |
| 2021/0191319 | A1* | 6/2021 | Christmas | G06F 3/011 |
| 2021/0373493 | A1* | 12/2021 | Song | G03H 1/265 |
| 2021/0382314 | A1* | 12/2021 | Seo | G02B 27/0093 |

FOREIGN PATENT DOCUMENTS

| | | | |
|---|---|---|---|
| WO | 2016/053735 | A1 | 4/2016 |
| WO | 2021/003090 | A1 | 1/2021 |

\* cited by examiner

HOLOGRAPHIC DISPLAY APPARATUS, HEAD-UP DISPLAY APPARATUS, AND IMAGE PROVIDING METHOD

CROSS-REFERENCE TO RELATED APPLICATION

This application is based on and claims priority under 35 U.S.C. § 119 to Korean Patent Application No. 10-2021-0053760, filed on Apr. 26, 2021, in the Korean Intellectual Property Office, the disclosure of which is incorporated by reference herein in its entirety.

BACKGROUND

1. Field

The disclosure relates to a holographic display apparatus, a head-up display apparatus, and an image providing method.

2. Description of Related Art

As a method of realizing a three-dimensional image, a glasses method and a glasses-free method are widely commercialized and used. The glasses method includes a polarized glasses method and a shutter glasses method, and the glasses-free method includes a lenticular method and a parallax barrier method. These methods use binocular parallax of two eyes, which has a limitation in an increase in the number of viewpoints and also makes a viewer feel fatigued because a depth perceived by the brain and a focus of the eyes do not match.

Recently, a holographic display method is gradually being commercialized as a three-dimensional image display method which may provide full parallax while the depth perceived by the brain and the focus of the eyes are matched. The holographic display method uses the principle that an image of an original object is reproduced by irradiating reference light to be diffracted by a holographic pattern recording an interference fringe obtained by interfering object light reflected from the original object and the reference light. A holographic display method currently being commercialized uses a method of providing a computer generated hologram (CGH) to a spatial light modulator as an electrical signal, instead of obtaining a holographic pattern by directly exposing an original object. According to an input CGH signal, the spatial light modulator may reproduce a three-dimensional image by forming a holographic pattern and diffracting an incident reference light.

When an image is generated by using a holographic display method, a wide eyebox and a wide field of view may be provided by using an eye-tracking sensor that recognizes the positions of a viewer's eyes and a beam deflector that changes the traveling direction of reference light.

SUMMARY

According to various embodiments, provided are a holographic display apparatus, a head-up apparatus, and an image providing method.

According to various embodiments, provided are various types of display apparatuses to which a structure capable of performing, in real time, calibration of an eye-tracking sensor and a beam deflector is applied.

Additional aspects will be set forth in part in the description which follows and, in part, will be apparent from the description, or may be learned by practice of embodiments of the disclosure.

In accordance with an aspect of the disclosure, a holographic display apparatus includes a backlight unit including a light source configured to emit coherent light; a spatial light modulator configured to diffract incident light from the backlight unit and generate a holographic image; a beam deflector configured to change a traveling direction of the incident light from the backlight unit to change a focal position of the holographic image; an eye-tracking sensor configured to recognize positions of a viewer's eyeballs; and a controller configured to perform, in real time, calibration of the eye-tracking sensor and the beam deflector to focus the holographic image on the recognized positions of the viewer's eyeballs.

The controller may be further configured to perform, in real time, mutual calibration of a first coordinate system in which a first position of the viewer's eyeballs is expressed, the first position being recognized by the eye-tracking sensor, and a second coordinate system in which a second position at which the holographic image generated by the spatial light modulator and having a traveling direction changed by the beam deflector is focused is expressed.

The first coordinate system may include a first origin and the second coordinate system include a second origin, and the controller may be further configured to control an operation of the beam deflector such that the second origin is positioned within a critical distance from the first origin.

The controller may be further configured to compare a first position of the viewer's eyeballs, the first position being recognized by the eye-tracking sensor, with a second position at which the holographic image is focused, and control an operation of the beam deflector to change the second position such that a distance between the first position and the second position is less than or equal to a critical distance.

The controller may include a memory in which a look-up table (LUT) formed in advance is stored, the LUT matching first data related to the first position with second data related to the second position.

The controller may be further configured to update, in real time, the LUT based on the first data related to the first position and the second data related to the second position when the distance between the first position and the second position is less than or equal to the critical distance.

The controller may be further configured to perform, in real time, calibration of the eye-tracking sensor and the beam deflector based on an image obtained by the eye-tracking sensor.

The holographic display apparatus may further include an infrared light source configured to emit infrared rays to be incident upon the beam deflector or the spatial light modulator; and an infrared sensor configured to sense an image generated by the infrared rays emitted from the infrared light source and reproduced by the beam deflector and the spatial light modulator, wherein the controller is further configured to perform, in real time, calibration of the eye-tracking sensor and the beam deflector based on the image sensed by the infrared sensor.

The controller may be further configured to calculate position coordinates at which a primary image of the holographic image is focused based on the image obtained by the eye-tracking sensor or the infrared sensor, the primary image being generated by first order diffracted light.

The controller may be further configured to calculate the position coordinates at which the primary image is focused by using a vision algorithm or a deep learning algorithm.

In accordance with an aspect of the disclosure, an image providing method using a display apparatus, the display apparatus comprising an image generating apparatus, a beam deflector configured to change a traveling direction of light from the image generating apparatus, and an eye-tracking sensor configured to recognize positions of a viewer's eyeballs, includes sensing a first position of the viewer's eyeballs using the eye-tracking sensor; providing an image generated using the image generating apparatus to the viewer's eyeballs; sensing a position at which the image is focused; and performing, in real time, mutual calibration of the eye-tracking sensor and the beam deflector based on the first position and the position at which the image is focused.

The performing of the mutual calibration in real time may include adjusting the position at which the image is focused by controlling an operation of the beam deflector such that the image is focused on a second position within a critical distance from the first position.

The performing of the mutual calibration in real time may include updating, in real time, a look-up table based on first data related to the first position and second data related to the second position when the image is focused on the second position.

The sensing of the position at which the image is focused may include sensing the position at which the image is focused using the eye-tracking sensor.

The display apparatus may further include an infrared sensor and the image generating apparatus may include an infrared light source, and the sensing of the position at which the image is focused may include sensing a position at which an image generated by infrared rays from the infrared light source is focused using the infrared sensor.

In accordance with an aspect of the disclosure, a head-up display apparatus configured to project an image on a windshield providing an external view to a driver includes a display apparatus including an image generating apparatus and an eye-tracking sensor configured to recognize the driver's eyeballs; an optical system configured to project the image from the display apparatus on the windshield; and a beam deflector configured to change a traveling direction of incident light from the image generating apparatus to change a position at which the image is focused, wherein the display apparatus further includes a controller configured to perform, in real time, calibration of the eye-tracking sensor and the beam deflector to focus the image on positions of the driver's eyeballs, the positions being recognized by the eye-tracking sensor.

The image generating apparatus may include a light source configured to emit coherent light and a spatial light modulator configured to reproduce a holographic image by diffracting incident light from the light source.

The optical system may include at least one optical lens configured to cause light emitted from the light source to be incident on the spatial light modulator.

The controller may be further configured to compare a first position of the driver's eyeballs, the first position recognized by the eye-tracking sensor, with a second position at which the image is focused, and control an operation of the beam deflector to change the second position such that a distance between the first position and the second position is less than or equal to a critical distance.

The controller may include a memory in which a look-up table (LUT) formed in advance is stored, the LUT matching first data related to the first position with second data related to the second position.

The controller may be further configured to update, in real time, the LUT based on the first data related to the first position and the second data related to the second position when the distance between the first position and the second position is less than or equal to the critical distance.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
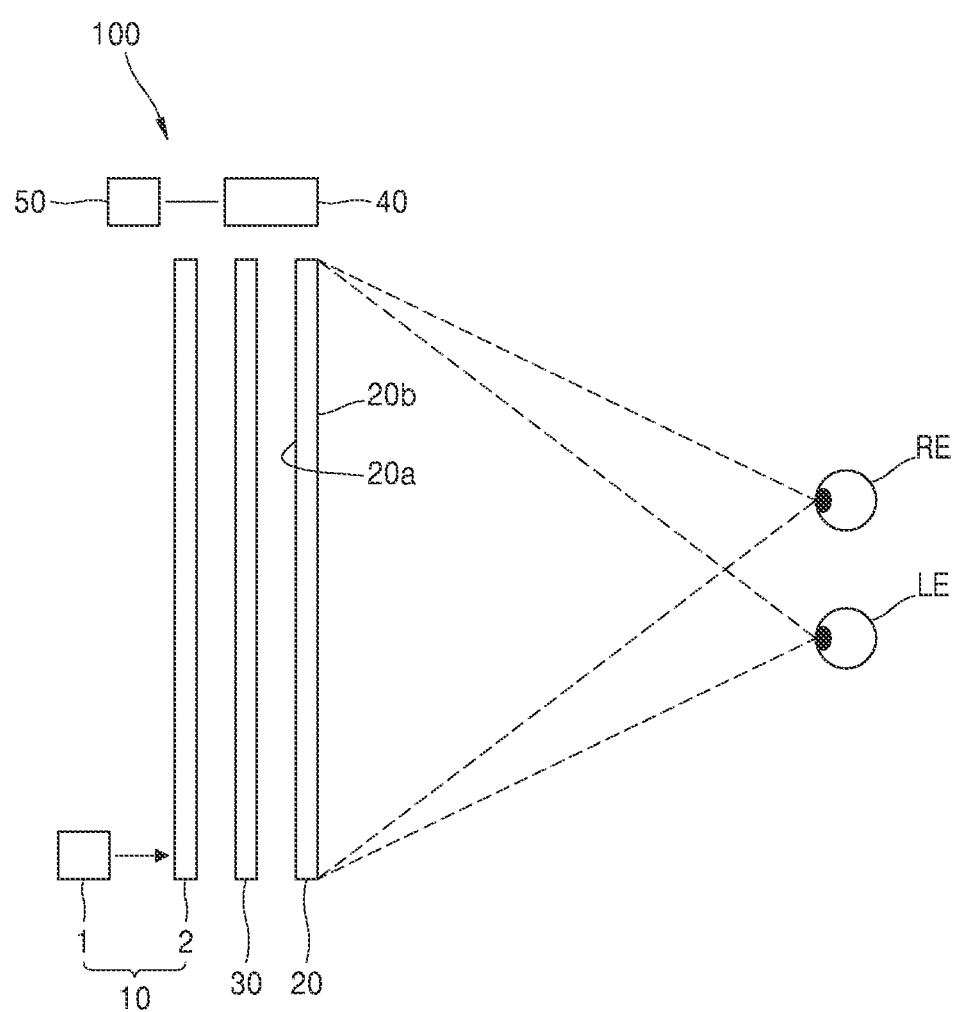
FIG. 1 schematically illustrates an example configuration of a holographic display apparatus according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a holographic display apparatus, a head-up display apparatus, and an image providing method according to various embodiments will be described in detail so that those of ordinary skill in the art may easily implement the embodiments with reference to the accompanying drawings. Like reference numerals in the drawings denote like components, and sizes or thicknesses of each component may be exaggerated for convenience of explanation.

The holographic display apparatus, the head-up display apparatus, and the image providing method to be described below may be implemented in various different forms and are not limited to the embodiments described herein. While such terms as "first," "second," etc., may be used to describe various components, such components are not intended to be limited by the above terms. The above terms are used only to distinguish one component from another.

Hereinafter, in the case where a position relationship between two items is described with the terms "on ~," "on the top of ~," or the like, one or more items may be interposed therebetween unless the term "directly" is used in the expression. An expression used in the singular encompasses the expression of the plural, unless it has a clearly different meaning in the context.

In the disclosure, when it is described that a portion "includes" a component, it means that other components may be further included, rather than excluding other components, unless otherwise stated.

The use of the term "the" and similar referential terms may be used in both the singular and the plural expressions. The use of all examples or example terms is merely for describing the technical idea in detail, and the scope is not limited by the examples or example terms unless limited by the claims.

Figure 2:
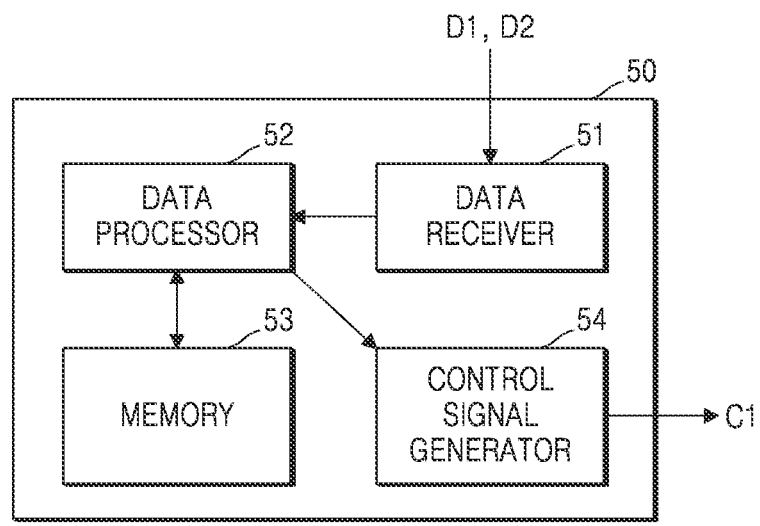
FIG. 2 is a block diagram schematically illustrating an example configuration of a controller included in the holographic display apparatus of FIG. 1.
Figure 3:
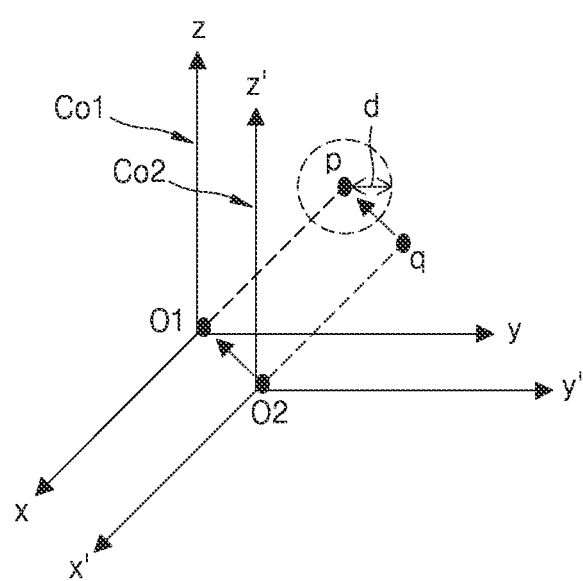
FIG. 3 is a diagram for explaining a calibration method for an eye-tracking sensor and a beam deflector included in the holographic display apparatus of FIG. 1.
Figure 4:
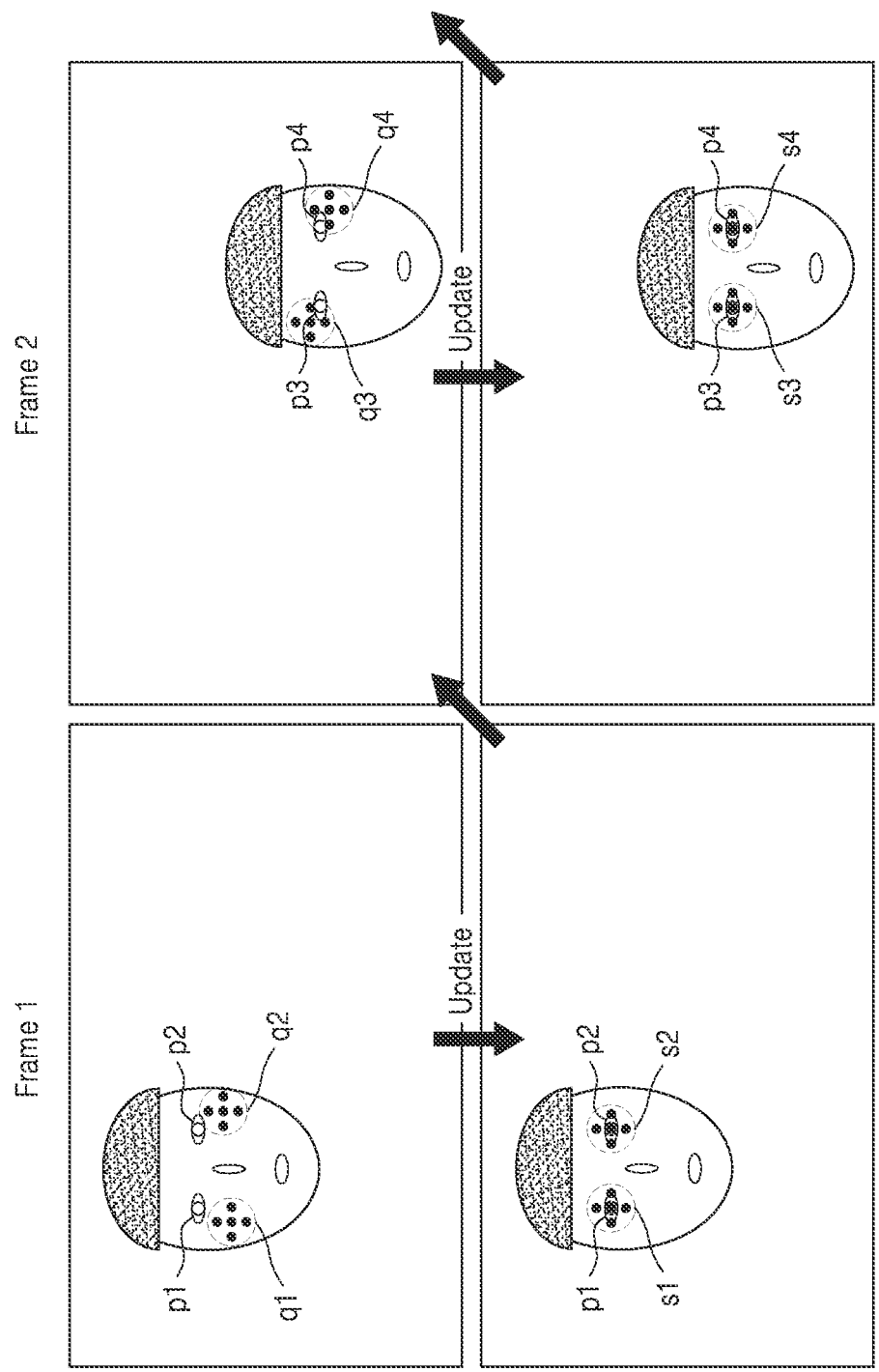
FIG. 4 is a diagram for explaining a calibration operation for the eye-tracking sensor and the beam deflector included in the holographic display apparatus of FIG. 1.

FIG. 1 schematically illustrates an example configuration of a holographic display apparatus 100 according to an embodiment. FIG. 2 is a block diagram schematically illustrating an example configuration of a controller 50 included in the holographic display apparatus 100 of FIG. 1. FIG. 3 is a diagram for explaining a calibration method for an eye-tracking sensor 40 and a beam deflector 30 included in the holographic display apparatus 100 of FIG. 1. FIG. 4 is a diagram for explaining a calibration operation for the eye-tracking sensor 40 and the beam deflector 30 included in the holographic display apparatus 100 of FIG. 1.

The holographic display apparatus 100 according to an embodiment may provide holographic images having different viewpoints in a viewer's right eye RE and left eye LE respectively in a binocular holographic method. For example, the holographic display apparatus 100 may provide a holographic image for the right eye to the viewer's right eye RE, and provide a holographic image for the left eye, which has a different viewpoint from the holographic image for the right eye, to the viewer's left eye LE. Unlike a left-eye image and a right-eye image in a stereoscopic method, the holographic image for the right eye and the holographic image for the left eye provided by the holographic display apparatus 100 may provide a three-dimensional effect to the viewer alone, and the holographic image for the right eye and the holographic image for the left eye are only different from each other in viewpoint. In the stereoscopic method, when a two-dimensional image for the right eye and a two-dimensional image for the left eye, which have different viewpoints from each other, are respectively recognized by a viewer's right eye and left eye, a three-dimensional effect is provided by using binocular parallax. Accordingly, in the stereoscopic method, a three-dimensional effect may not be provided by only one of the right-eye image and the left-eye image, and a depth perceived by the brain and a focus of the eyes do not match, so that the viewer may feel fatigued. On the other hand, because the holographic display apparatus 100 respectively forms the holographic image for the left eye and the holographic image for the right eye in a position of a certain space, that is, at the field of vision of the viewer's right eye RE and left eye LE, the depth perceived by the brain and the focus of the eyes may match and complete parallax may be provided. The reason that the holographic display apparatus 100 provides only a binocular viewpoint is to reduce data processing amount by removing remaining viewpoint information other than viewpoint information that the viewer is capable of recognizing because the viewer may recognize only two viewpoints at a time through the right eye RE and the left eye LE. However, the holographic display apparatus 100 according to various embodiments may provide more than two viewpoints.

Referring to FIG. 1, the holographic display apparatus 100 may include a backlight unit 10 having a light source 1 emitting coherent light, a spatial light modulator 20 reproducing a holographic image by diffracting incident light from the backlight unit 10, the beam deflector 30 arranged on the side of an incident surface 20a or an exit surface 20b of the spatial light modulator 20, the beam deflector 30 changing the traveling direction of the incident light from the backlight unit 10 or the spatial light modulator 20 to change a position at which the holographic image is focused, the eye-tracking sensor 40 recognizing positions of the viewer's right eye RE and left eye LE, and the controller 50 performing, in real time, mutual calibration on the eye-tracking sensor 40 and the beam deflector 30 to make the holographic image to be focused on the positions of the viewer's right eye RE and left eye LE, the positions being recognized by the eye-tracking sensor 40.

The backlight unit 10 may include the light source 1 emitting coherent light, for example, laser light. For example, the light source 1 may include a laser diode that generates light having high coherence. However, any light that has a certain degree of spatial coherence may be diffracted and modulated by the spatial light modulator 20, so other light sources may also be used as long as the light sources emit light having a certain degree of spatial coherence. The light source 1 may be configured to emit all of blue light, green light, and red light.

In addition, the backlight unit 10 may further include a light guide plate 2 that widens an incident area of light from the light source 1. For example, the light guide plate 2 may change spot light incident from the light source 1 into surface light and output the same. The thickness of the light guide plate 2 may vary. For example, the light guide plate 2 may have a thickness of about 0.1 mm to about 10 mm.

The spatial light modulator 20 forms a holographic image by using light provided by the backlight unit 10. For example, the spatial light modulator 20 may include at least one from among a liquid crystal display (LCD) panel, a liquid crystal on silicon (LCos) panel, and a digital micro-mirror display (DMD) panel.

The spatial light modulator 20 may form a holographic pattern having an interference fringe for modulating incident light. Such a holographic pattern may be a computer-generated hologram (CGH) formed according to a control signal of the controller 50. A holographic image may be reproduced at a position of a certain space by diffracting and modulating light incident on the spatial light modulator 20 by such a holographic pattern.

The beam deflector 30 may be arranged on the side of the incident surface 20a of the spatial light modulator 20 and may change a traveling direction of incident light from the backlight unit 10. However, the disclosure is not limited thereto. Different from that shown in FIG. 1, the beam deflector 30 may be arranged on the side of the exit surface 20b of the spatial light modulator 20 and may change a traveling direction of incident light emitted from the backlight unit 10 and modulated by the spatial light modulator 20. By changing the traveling direction of incident light by the beam deflector 30, a position at which a holographic image reproduced by modulating light passing through the beam deflector 30 and incident on the spatial light modulator 20 may be adjusted. For example, the beam deflector 30 may be implemented using a liquid crystal layer or an electro-wetting element.

The beam deflector 30 may be a liquid crystal deflector that diffracts incident light to generate two light beams traveling at different angles from each other. Accordingly, each of the two light beams generated by the beam deflector 30 may be modulated by the spatial light modulator 20 to form an image for the right eye RE and an image for the left eye LE, respectively. However, the disclosure is not limited thereto, and the beam deflector 30 may also transmit a single beam to the spatial light modulator 20 by modulating the traveling direction of incident light.

The eye-tracking sensor 40 may recognize positions of the viewer's right eye RE and left eye RE in real time. A distance between the right eye RE and the left eye RE, which is unique to each viewer, may be sensed by the eye-tracking sensor 40, and in addition, a change in the positions of the right eye RE and the left eye LE due to a movement of the viewer may also be sensed. As described above, the beam deflector 30 may change the traveling direction of incident light according to information related to the sensed positions of the viewer's right eye RE and left eye LE. The eye-tracking sensor 40 may include an infrared sensor, a visible light camera, and/or other various sensors.

In addition, the eye-tracking sensor 40 may also recognize a position at which a holographic image reproduced by the spatial light modulator 20 is focused. For example, the eye-tracking sensor 40 may obtain an image in which the holographic image is focused around the viewer's right eye RE and left eye LE.

The controller 50 may appropriately control the beam deflector 30 according to the positions of the viewer's right eye RE and left eye LE sensed by the eye-tracking sensor 40. For example, the controller 50 may chronologically control the traveling direction of light beams by controlling the beam deflector 30 so that holographic images are sequentially formed on the viewer's right eye RE and left eye LE. However, the disclosure is not limited thereto, and when the beam deflector 30 spatially separates incident light to be directed to the right eye RE and the left eye LE, the chronological driving of the beam deflector 30 may not be necessary.

The controller 50 may perform, in real time, mutual calibration on the eye-tracking sensor 40 and the beam deflector 30 such that the holographic images may be focused on the positions of the viewer's right eye RE and left eye LE recognized by the eye-tracking sensor 40. In an operation of manufacturing the holographic display apparatus 100, calibration may be performed in advance such that positions at which holographic images adjusted by the beam deflector 30 are focused match with the positions of the viewer's right eye RE and left eye LE recognized by the eye-tracking sensor 40. For example, when it is recognized that the viewer's right eye RE and left eye LE are positioned at particular points, how and how much the beam deflector 30 should be operated may be determined and stored in a memory 53 included in the controller 50 in a form of a look-up table LUT.

However, dislocation may occur in an arrangement relationship of components included in the holographic display device 100 due to an external impact during a manufacturing operation or a use operation. Accordingly, even when the beam deflector 30 is operated according to the look-up table LUT according to the calibration performed in advance, holographic images may not be focused at the particular points where the viewer's right eye RE and left eye LE are positioned. The controller 50 may focus a holographic image on the positions of the viewer's right eye RE and left eye LE by performing, in real time, mutual calibration of the eye-tracking sensor 40 and the beam deflector 30.

Referring to FIG. 2, the controller 50 may include a data receiver 51 receiving first data D1 related to a first position of the viewer's right eye RE and left eye LE recognized by the eye-tracking sensor 40 and second data D2 related to a second position at which a holographic image adjusted by the beam deflector 30 is focused, a data processor 52 processing the first data D1 and the second data D2 from the data receiver 51 to calculate an operation control amount of the beam deflector 30 and update the look-up table LUT, the memory 53 storing the look-up table LUT which is updated, and a control signal generator 54 generating a control signal Cl for the beam deflector 30 based on the operation control amount of the beam deflector 30 calculated by the data processor 52. The control signal Cl from the control signal generator 54 may be transmitted to the beam deflector 30 to control an operation of the beam deflector 30.

Referring to FIG. 3, the controller 50 may perform, in real time, mutual calibration of a first coordinate system xyz in which a first position p of the viewer's eyeballs recognized by the eye-tracking sensor 40 is expressed and a second coordinate system x'y'z' in which a second position q at which a holographic image generated by light diffracted by the spatial light modulator 20 and a traveling direction thereof is changed by the beam deflector 30 is focused is expressed. For example, the controller 50 may control an operation of the beam deflector 30 so that a second origin O2 of the second coordinate system x'y'z' is positioned within a critical distance d from a first origin O1 of the first coordinate system xyz. Accordingly, the first position p expressed in the first coordinate system xyz and the second position q expressed in the second coordinate system x'y'z' may be substantially identical to each other.

Herein, the critical distance d is a distance between the center of a holographic image and the center of the viewer's right eye RE and left eye LE, and may be a distance such that a position at which a holographic image is focused and the positions of the viewer's right eye RE and left eye LE are substantially coincident. The critical distance d may be variously changed according to the design of the holographic display apparatus 100.

Referring to FIG. 4, the controller 50 may compare first positions p1, p2, p3, and p4 of the viewer's right eye RE and left eye LE recognized by the eye-tracking sensor 40 with second positions q1, q2, q3, and q4 at which holographic images from the spatial light modulator 20 are focused, and control an operation of the beam deflector 30 to change the second positions q1, q2, q3, and q4 such that a distance between the first positions p1, p2, p3, and p4 and the second positions q1, q2, q3, and q4 is less than or equal to a critical distance. Herein, the second positions q1, q2, q3, and q4 at which hologram images are focused may be recognized by the eye-tracking sensor 40.

For example, at a first time point, the controller 50 may compare the first positions p1 and p2 of the viewer's right eye RE and left eye LE with the second positions q1 and q2 at which a first frame image of holographic images is focused. The controller 50 may control an operation of the beam deflector 30 so that the distance between the first positions p1 and p2 of the viewer's right eye RE and left eye LE and the second positions q1 and q2 at which the first frame image is focused is less than or equal to the critical distance. Accordingly, the first frame image may be focused on new second positions s1 and s2. In addition, in a second time point, the controller 50 may compare the first positions p3 and p4 of the viewer's right eye RE and left eye LE with the second positions q3 and q4 at which a second frame image of holographic images is focused. The controller 50 may control an operation of the beam deflector 30 so that a distance between the first positions p3 and p4 of the viewer's right eye RE and left eye LE and the second positions q3 and q4 at which the second frame image is focused is less than or equal to the critical distance. Accordingly, the second frame image may be focused on new second positions s3 and s4.

Compared to the first frame image focused on the second positions q1, q2, q3, and q4 before the adjustment, the first frame image focused on the new second positions 51, s2, s3, and s4 may be more precisely provided to the viewer's right eye RE and left eye LE.

In this way, the controller 50 may, for each frame of a holographic image, sense a change in positions of the viewer's right eye RE and left eye LE and control the beam deflector 30 to provide a more accurate holographic image to the viewer's right eye RE and left eye LE, the positions of which change in real time.

In addition, the look-up table LUT formed in advance based on first data related to the first positions p1, p2, p3, and p4 and second data related to the second positions q1, q2, q3, and q4 may be stored in the memory 53 of the controller 50. The look-up table LUT may be formed in advance in an operation of manufacturing the holographic display apparatus 100. However, an error may occur in the look-up table LUT due to dislocation between components of the holographic display apparatus 100. The controller 50 may perform, in real time, mutual calibration of the beam deflector 30 and the eye-tracking sensor 40, and may update the look-up table LUT based on a result of calibration. An operation in which the controller 50 updates the look-up table LUT will be described below with reference to FIGS. 5 to 7.

The holographic display apparatus 100 according to an embodiment described so far may be applied to, for example, a mobile phone. When a user looks at the screen of a mobile phone, by using the beam deflector 30 and the eye-tracking sensor 40, a three-dimensional image may be displayed according to the positions of the user's right eye RE and left eye LE by tracking a movement of the positions of the user's right eye RE and left eye LE.

Figure 5:
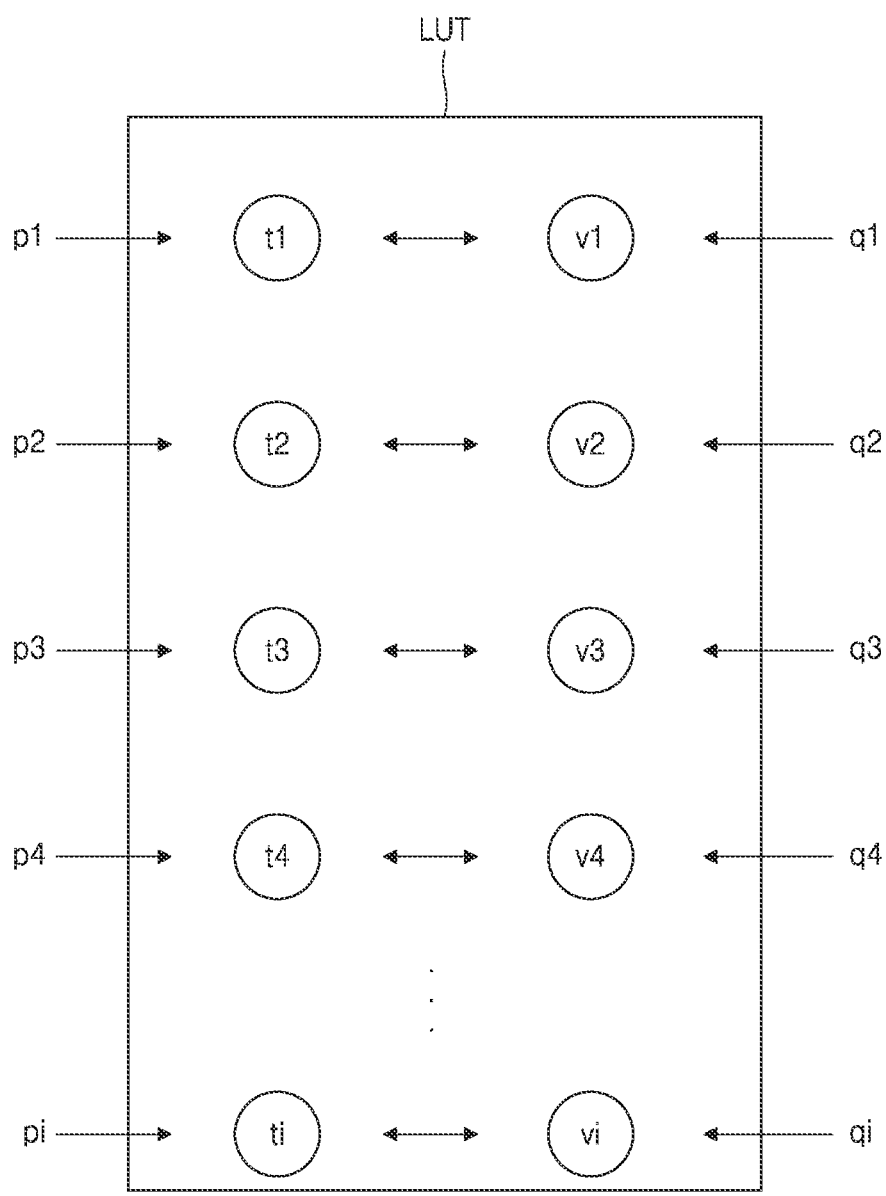
FIG. 5 is a diagram for explaining an example configuration of a look-up table that is formed in advance and stored in the controller of FIG. 1.
Figure 6:
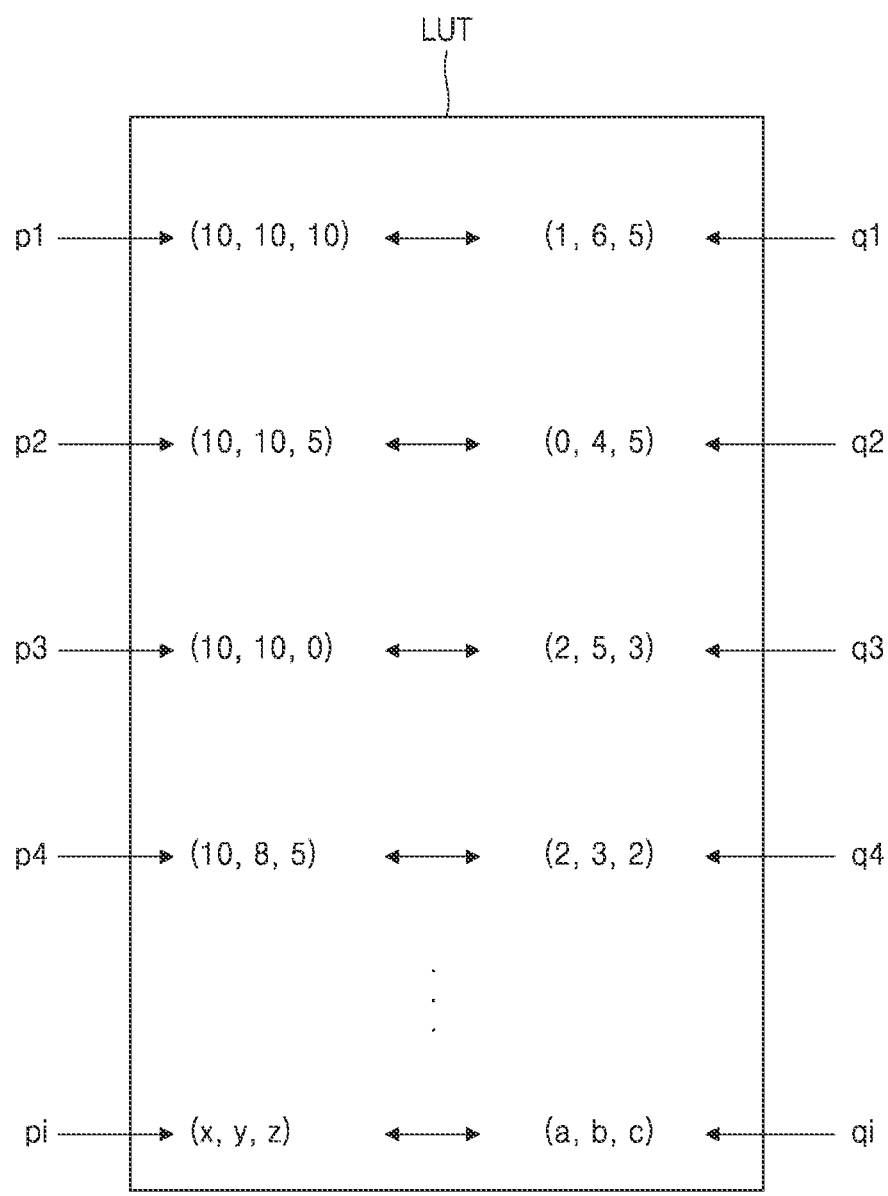
FIG. 6 is a diagram for explaining an example configuration of a look-up table that is formed in advance and stored in the controller of FIG. 1.
Figure 7:
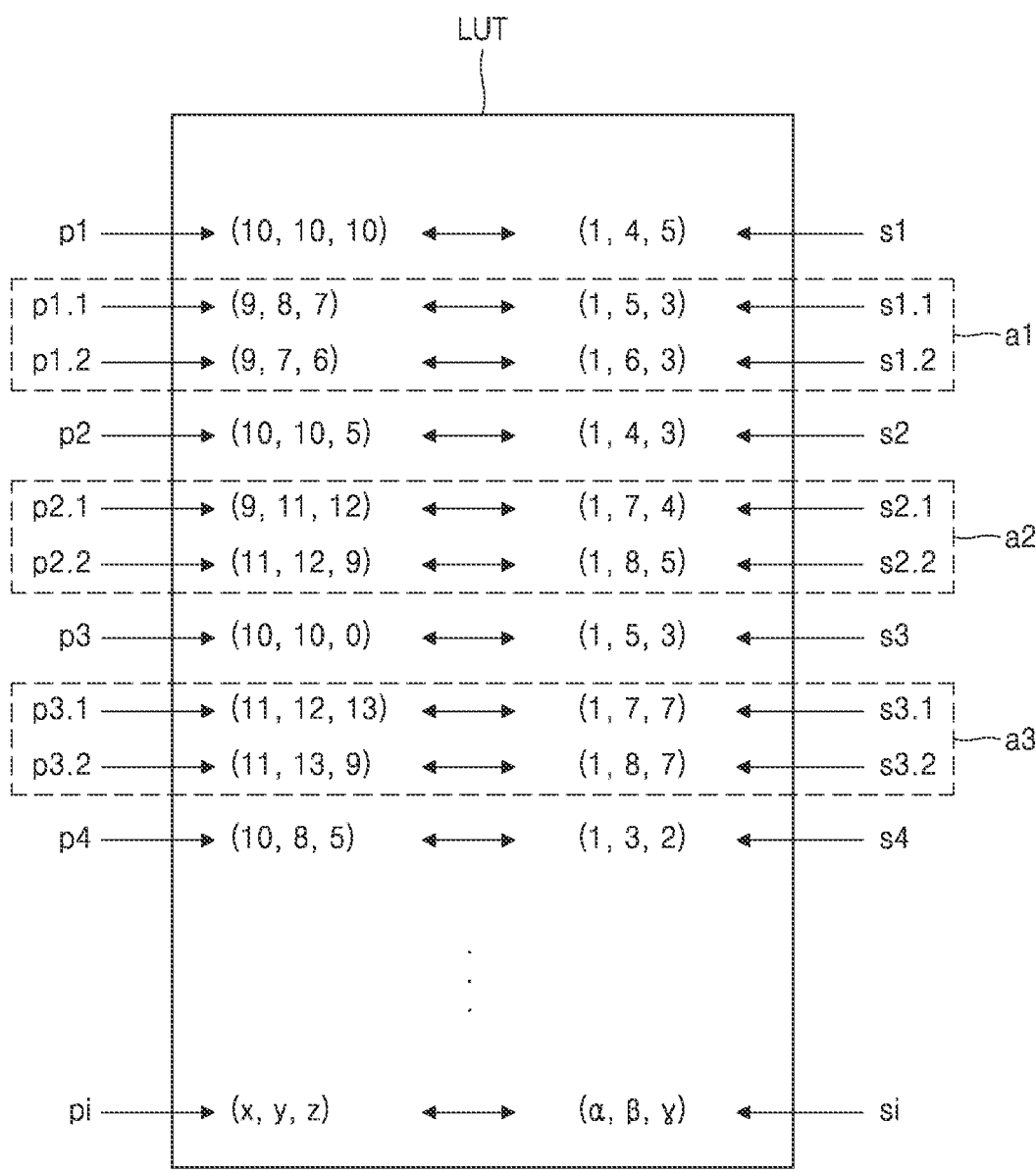
FIG. 7 is a diagram for explaining an example configuration of a look-up table that is updated and stored in real time in the controller of FIG. 1.

FIGS. 5 and 6 are diagrams for explaining an example configuration of the look-up table LUT that is formed in advance and stored in the controller 50 of FIG. 1. FIG. 7 is a diagram for explaining an example configuration of the look-up table LUT that is updated and stored in real time in the controller 50 of FIG. 1. FIGS. 5 to 7 will be described with reference to FIGS. 1 to 4.

Referring to FIG. 5, a plurality of pieces of first data t1, t2, t3, t4, . . . , ti related to a plurality of first positions p1, p2, p3, p4, . . . , pi of the viewer's right eye RE and left eye LE are matched with a plurality of pieces of second data v1, v2, v3, v4, . . . , vi related to a plurality of second positions q1, q2, q3, q4, . . . , qi at which holographic images are focused. For example, the first data t1 related to the first position p1 of the plurality of first positions p1, p2, p3, p4, . . . , pi may be matched with the second data v1 related to the second position q1 corresponding to the first position p1 of the plurality of second positions q1, q2, q3, q4, . . . , qi. Herein, the first position p1 and the second position q1 which correspond to each other may respectively mean the positions of the viewer's right eye RE and left eye RE and a position at which a holographic image is focused when the holographic image is provided to the viewer's right eye RE and left eye LE as accurately as possible.

Referring to FIG. 6, the plurality of pieces of first data t1, t2, t3, t4, . . . , ti, which is recorded in the look-up table LUT, related to the plurality of first positions p1, p2, p3, p4, . . . , pi of the viewer's right eye RE and left eye LE may include position coordinates of the viewer's right eye RE and left eye LE. For example, the plurality of pieces of first data t1, t2, t3, t4, . . . , ti may be respectively expressed as (10, 10, 10), (10, 10, 5), (10, 10, 0), (10, 8, 5), . . . , (x, y, z). However, this is an example, and the plurality of pieces of first data t1, t2, t3, t4, . . . , ti may be expressed as various types of data related to the positions of the viewer's right eye RE and left eye LE.

In addition, the plurality of pieces of second data v1, v2, v3, v4, . . . , vi, which is recorded in the look-up table LUT, related to the plurality of second positions q1, q2, q3, q4, . . . , qi at which holographic images are focused may be driving information for the beam deflector 30 to make the holographic images to be focused on the plurality of second positions q1, q2, q3, q4, . . . , qi. For example, the plurality of pieces of second data v1, v2, v3, v4, . . . , vi may be respectively expressed as (1, 6, 5), (0, 4, 5), (2, 5, 3), (2, 3, 2), . . . , (a, b, c). However, this is only an example, and the plurality of pieces of second data v1, v2, v3, v4, . . . , vi may be expressed as various types of data related to the driving information of the beam deflector 30.

As such, the plurality of pieces of first data expressed as (10, 10, 10), (10, 10, 5), (10, 10, 0), (10, 8, 5), . . . , (x, y, z) and the plurality of pieces of second data expressed as (1, 6, 5), (0, 4, 5), (2, 5, 3), (2, 3, 2), . . . , (a, b, c) may be matched with each other and recorded in the look-up table LUT which is formed in advance in an operation of manufacturing the holographic display apparatus 100.

Referring to FIG. 7, the controller 50 may, in real time, update the look-up table LUT which is formed in advance. For example, when a distance between the plurality of first positions p1, p2, p3, p4, . . . , pi and a plurality of second positions s1, s2, s3, s4, . . . , si is less than or equal to a critical distance, the controller 50 may update the look-up table LUT in real time based on first data related to the plurality of first positions p1, p2, p3, p4, . . . , pi and second data related to the plurality of second positions s1, s2, s3, s4, . . . , si.

For example, when the viewer's right eye RE and left eye LE are positioned at the first positions p1 and p2, the controller 50 may control an operation of the beam deflector 30 to make holographic images to be focused on the second positions 51 and s2 within the critical distance from the first positions p1 and p2. The controller 50 may update the look-up table LUT based on information formed by matching the first data and the second data when the viewer's right eye RE and left eye LE are positioned at the first positions p1 and p2 and the holographic images are positioned at the second positions s1 and s2. In this case, the second data matched with the first data expressed as (10, 10, 10) and (10, 10, 5) may be expressed as (1, 4, 5) and (1, 4, 3). In this way, the controller 50 may update the look-up table LUT based on a plurality of pieces of first data and second data. As shown in FIG. 7, as in the case of FIG. 6, the plurality of pieces of first data expressed as (10, 10, 10), (10, 10, 5), (10, 10, 0), (10, 8, 5), . . . , (x, y, z) may be recorded in the look-up table LUT which is updated. In addition, different from that shown in FIG. 6, the plurality of pieces of second data expressed as (1, 4, 5), (1, 4, 3), (1, 5, 3), (1, 3, 2), . . . , ($\alpha$, $\beta$, $\gamma$) may be recorded in the look-up table LUT which is updated.

In addition, the controller 50 may precisely update the look-up table LUT by using additional data. For example, the controller 50 may update the look-up table LUT by obtaining additional data a1, a2, a3 related to a plurality of positions between the plurality of first positions p1, p2, p3, p4, . . . , pi, wherein the controller 50 forms the look-up table LUT in the operation of manufacturing the holographic display apparatus 100 based on the plurality of first positions p1, p2, p3, p4, . . . , pi.

For example, the controller 50 may update the look-up table LUT by using information in which first data related to new first positions p1.1 and p1.2 between the first positions p1 and p2 and second data, which corresponds to the first data and which is related to new second positions s1.1 and s1.2 are matched with each other. In this case, the first data related to the new first positions p1.1 and p1.2 may be respectively expressed as (9, 8, 7) and (9, 7, 6), and the second data related to the new second positions s1.1 and s1.2 may be expressed as (1, 5, 3) and (1, 6, 3).

In this way, the controller 50 may update the look-up table LUT more precisely by using data related to new first positions p1.1, p1.2, p2.1, p2.2, p3.1, and p3.2 and new second positions s1.1, s1.2, s2.1, s2.2, s3.1, and s3.2.

Figure 8:
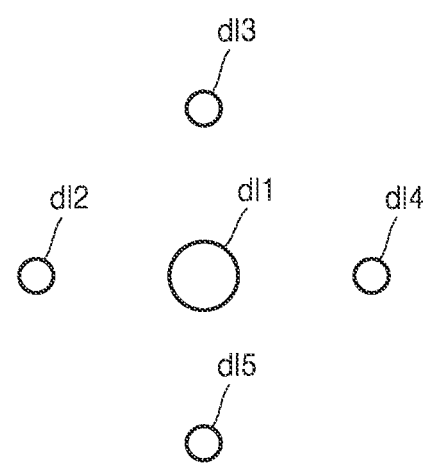
FIG. 8 is a diagram for explaining an example configuration of a holographic image focused by the holographic display apparatus of FIG. 1.

FIG. 8 is a diagram for explaining an example configuration of a holographic image focused by the holographic display apparatus 100 of FIG. 1. FIG. 8 will be described with reference to FIGS. 1 to 7.

Referring to FIG. 8, a holographic image focused on the viewer's right eye RE and left eye LE by the holographic display apparatus may include an n-th image generated by n-th (wherein n is an integer) order diffracted light. For example, the holographic image may include a primary image dl1 generated by primary (e.g., first order) diffracted light diffracted by the spatial light modulator 20. In addition, the holographic image may include secondary images dl2, dl3, dl4, and dl5 generated by secondary (e.g., second order) diffracted light. The shapes of the first image dl1 and the second images dl2, dl3, dl4, and dl5 shown in FIG. 8 are examples, and may be variously shown in cases.

The controller 50 may calculate position coordinates at which the primary image dl1, which is generated by the primary diffracted light, of the holographic image is focused, and may update the look-up table LUT based on the calculated position coordinates at which the primary image dl1 is focused and the positions of the viewer's right eye RE and left eye LE.

When the primary image dl1, which is generated by the primary diffracted light, of the holographic image is used, a clearer and more accurate holographic image may be provided to the viewer. However, the disclosure is not limited thereto, and the controller 50 may update the look-up table LUT based on position coordinates of images of various orders generated by diffracted light of various orders other than the primary image dl1.

When the controller 50 calculates the position coordinates of the primary image dl1, the controller 50 may use a vision algorithm or a deep learning algorithm. However, the disclosure is not limited thereto, and the controller 50 may calculate the position coordinates of the primary image dl1 by using various types of programs and algorithms.

Figure 9:
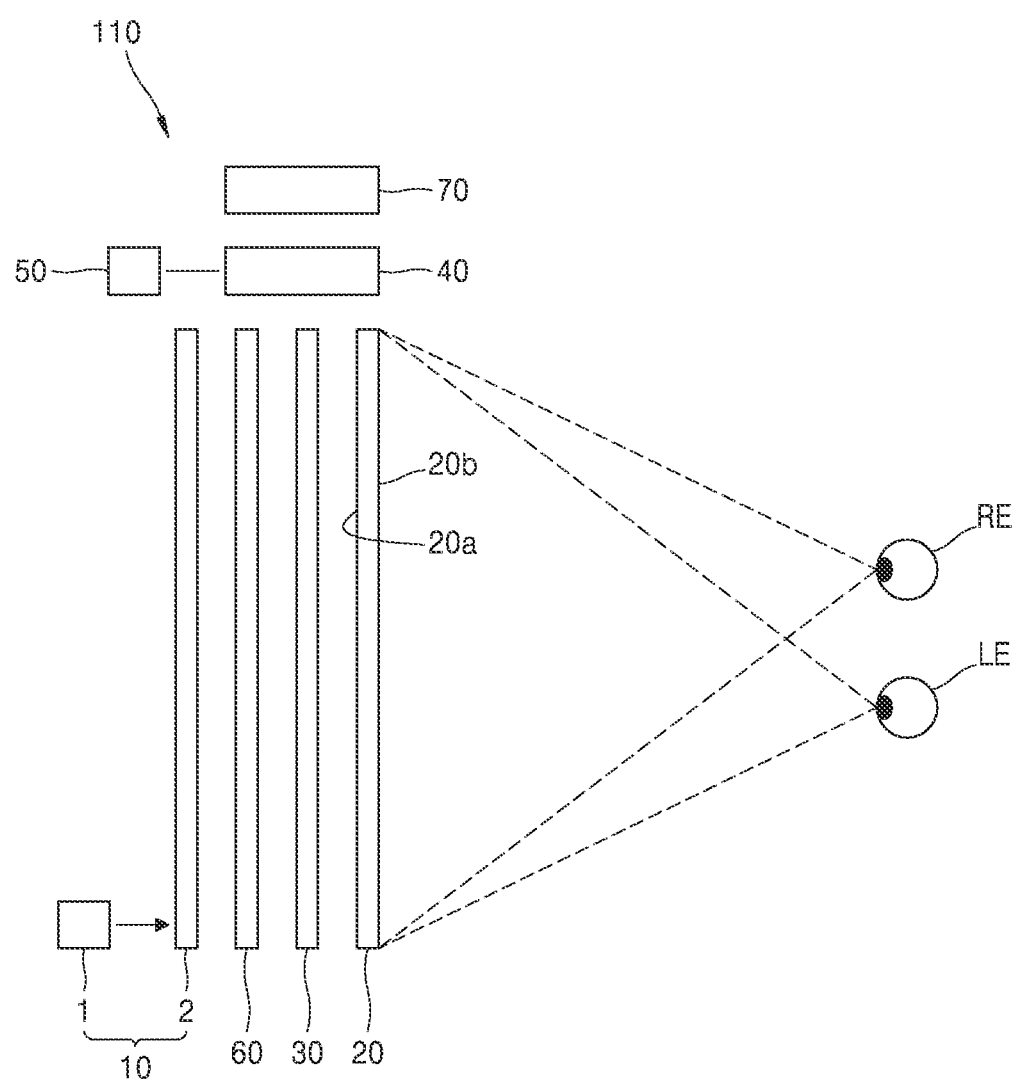
FIG. 9 schematically illustrates an example configuration of a holographic display apparatus according to an embodiment.

FIG. 9 schematically illustrates an example configuration of a holographic display apparatus 110 according to an embodiment.

The holographic display apparatus 110 of FIG. 9 may be substantially the same as the holographic display apparatus 100 of FIG. 1, except that the holographic display apparatus 110 further includes a field lens 60 and an infrared sensor 70. Descriptions of FIG. 9 already given with reference to FIGS. 1 to 8 will be omitted.

Referring to FIG. 9, the holographic display apparatus 110 may include the backlight unit 10 including the light source 1 and the light guide plate 2, the spatial light modulator 20, the beam deflector 30, the eye-tracking sensor 40, the controller 50, the field lens 60, and the infrared sensor 70.

The field lens 60 may focus incident light from the backlight unit 10 in a certain space. The field lens 60 may include, for example, any one of an optical lens, a Fresnel lens, a liquid crystal lens, and a holographic optical element (HOE). The field lens 60 is illustrated as being provided between the backlight unit 10 and the beam deflector 30 in FIG. 9, but is not limited thereto, and the position of the field lens 60 may be variously changed. For example, the field lens 60 may be provided between the beam deflector 30 and the spatial light modulator 20. In addition, the field lens 60 may also be provided on the side of the exit surface 20b of the spatial light modulator 20.

The infrared sensor 70 may sense an image generated by infrared rays emitted from an infrared light source that may be included in the light source 1 and regenerated through the beam deflector 30 and the spatial light modulator 20. For example, the infrared rays emitted from the light source 1 may be focused near the viewer's right eye RE and left eye LE in a form of a certain image through the beam deflector 30 and the spatial light modulator 20. The infrared sensor 70 may sense a position where the infrared rays are focused, and the controller 50 may perform, in real time, calibration on the eye-tracking sensor 40 and the beam deflector 30 based on a position at which a sensed infrared image is focused.

Figure 10:
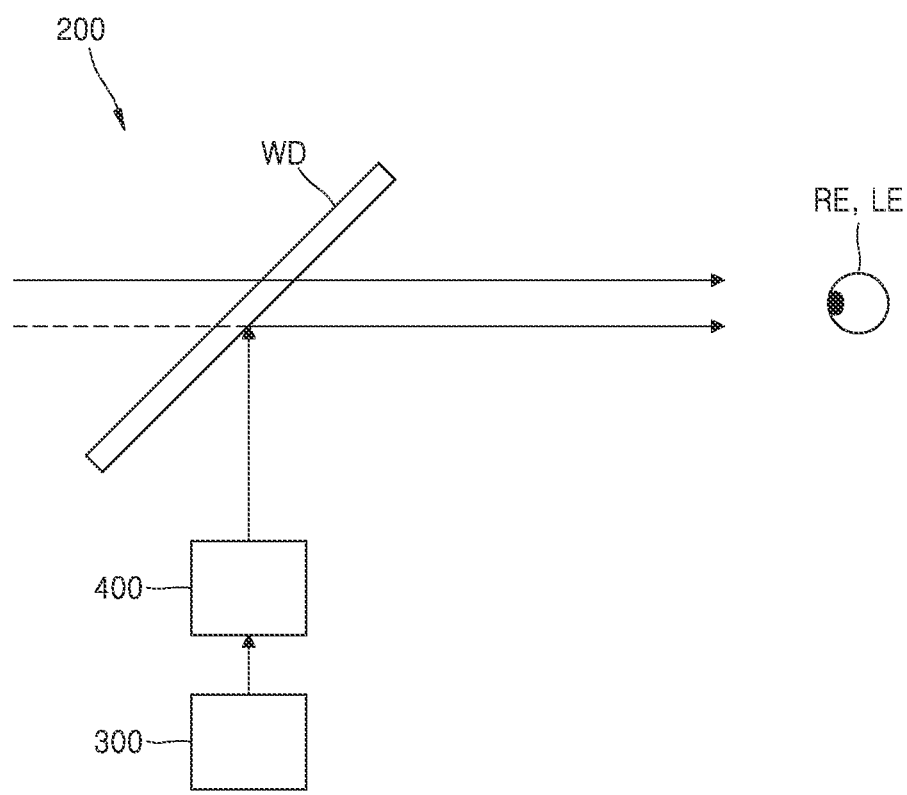
FIG. 10 schematically illustrates an example configuration of a head-up display apparatus according to an embodiment.
Figure 11:
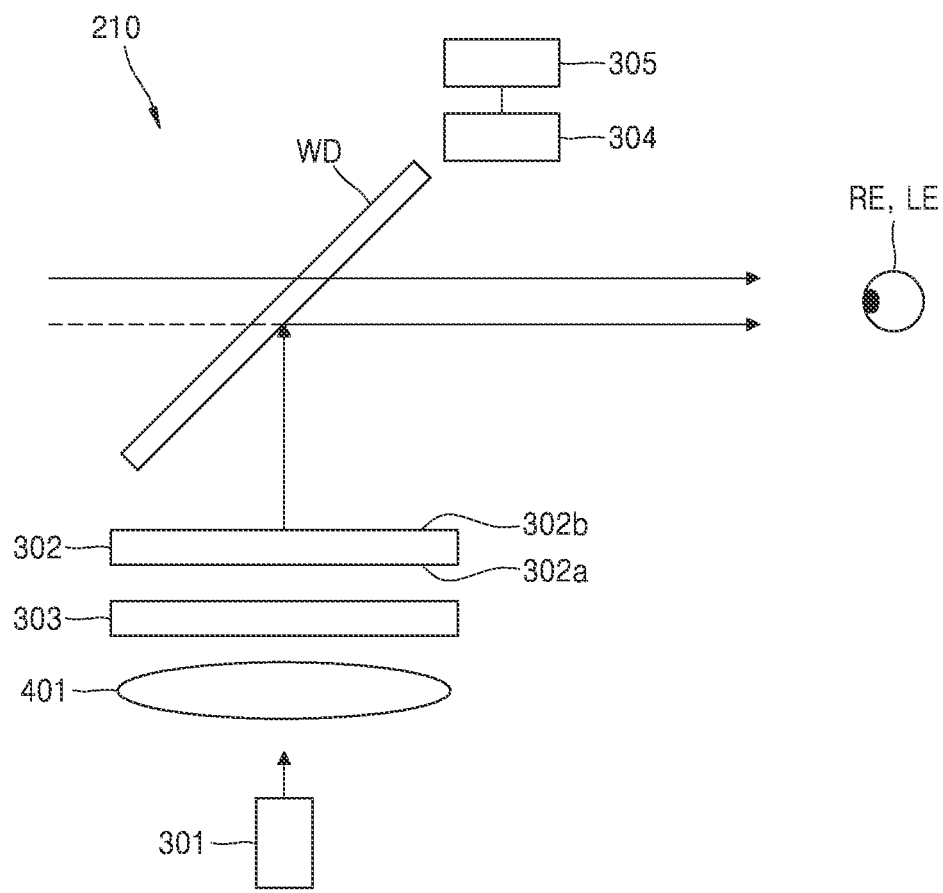
FIG. 11 schematically illustrates an example configuration of a head-up display apparatus according to an embodiment.

FIG. 10 schematically illustrates an example configuration of a head-up display apparatus 200 according to an embodiment. FIG. 11 schematically illustrates an example configuration of a head-up display apparatus 210 according to an embodiment.

Referring to FIG. 10, the head-up display apparatus 200 may be an apparatus projecting an image on a windshield WD that provides an external view to a driver. The head-up display apparatus 200 may include a display apparatus 300 generating an image to be provided to the driver and an optical system 400 that makes an image from the display apparatus 300 to be projected on the windshield WD. A real image from the outside of the windshield WD and a virtual image from the display apparatus 300 may be combined and transmitted to the driver's right eye RE and left eye LE.

The head-up display apparatus 200 may include an image generating apparatus generating an image and an eye-tracking sensor recognizing the positions of the driver's right eye RE and left eye LE. The image generating apparatus may include an apparatus generating a two-dimensional image, such as an organic light-emitting diode (OLED), a liquid crystal display (LCD), or the like, or an apparatus generating a three-dimensional image such as a holographic display apparatus.

In addition, the head-up display apparatus 200 may further include a beam deflector which is included in the display apparatus 300 or the optical system 400 and changes the traveling direction of incident light from the image generating apparatus such that a position at which an image is focused is changed. When the beam deflector is included in the optical system 400, the beam deflector may be implemented as a rotating mirror which is rotatable to change the traveling direction of light from the image generating apparatus. However, the disclosure is not limited thereto, and the beam deflector may be implemented as various types of optical elements.

In addition, the display apparatus 300 may further include a controller performing, in real time, calibration on the eye-tracking sensor and the beam deflector such that an image may be focused on the positions of the driver's right eye RE and left eye LE recognized by the eye-tracking sensor.

The optical system 400 may include, for example, various types of optical lenses, which make an image from the display apparatus 300 to be projected on the windshield WD. The optical system 400 may include a plurality of optical lenses as necessary.

Referring to FIG. 11, the head-up display apparatus 210 may include, for example, a display apparatus including a light source 301, a spatial light modulator 302, a beam deflector 303, an eye-tracking sensor 304, and a controller 305. The beam deflector 303 may be provided on the side of an incident surface 302*a* or an exit surface 302*b* of the spatial light modulator 302. The controller 305 may perform, in real time, mutual calibration of the eye-tracking sensor 304 and the beam deflector 303 such that an image may be focused on the positions of the driver's right eye RE and left eye LE recognized by the eye-tracking sensor 304. Because detailed configurations of the light source 301, the spatial light modulator 302, the beam deflector 303, the eye-tracking sensor 304, and the controller 305 are the same as the descriptions already given with reference to FIGS. 1 to 9, descriptions thereof will be omitted.

The head-up display apparatus 210 may include at least one optical lens 401 which makes light emitted from the light source 301 to be incident on the spatial light modulator 302. As shown in FIG. 11, the at least one optical lens 401 may be implemented as a convex lens, but is not limited thereto, and may also be implemented as a lens of various types.

Figure 12:
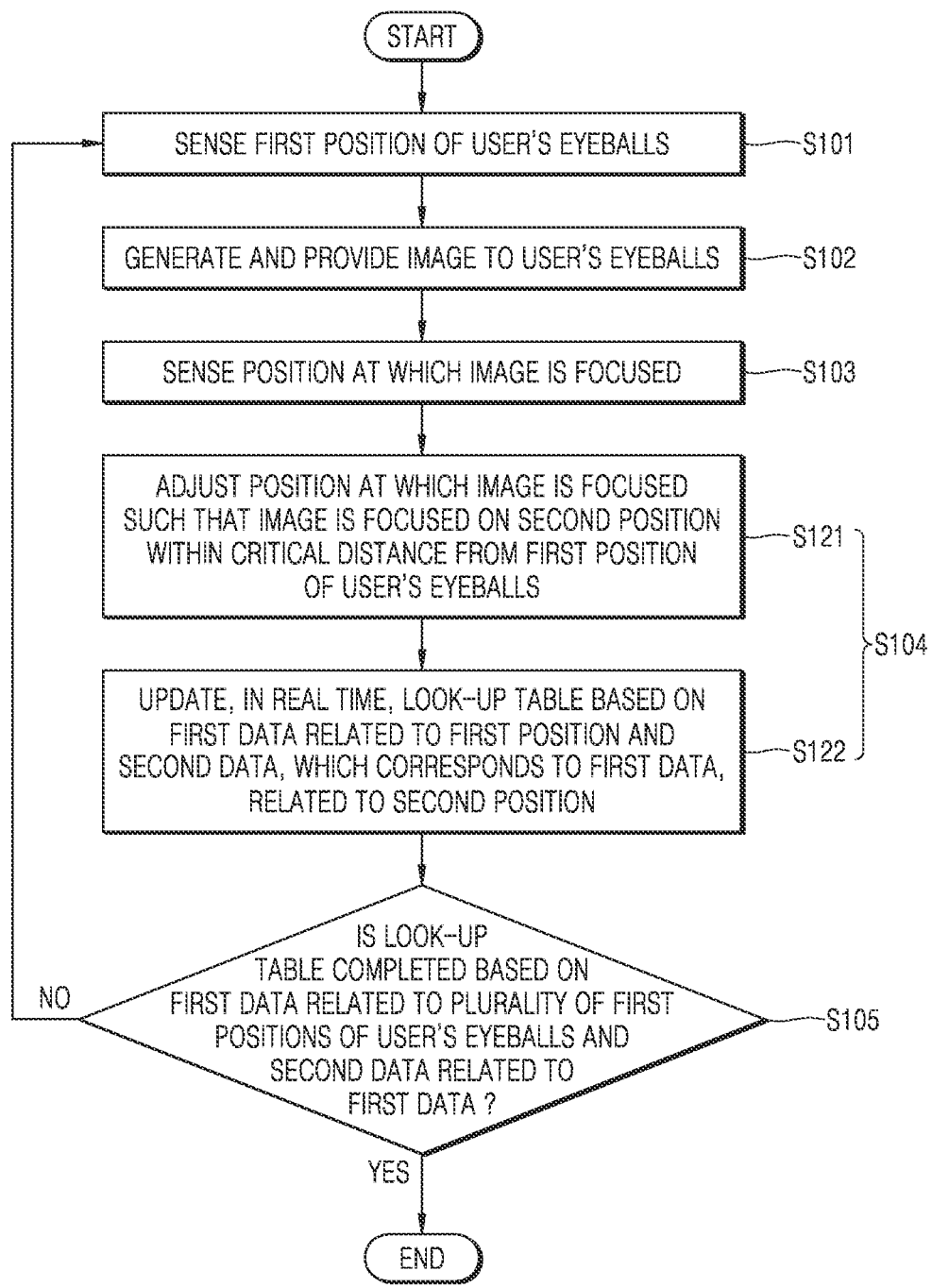
FIG. 12 is a flowchart for explaining a an image providing method according to an embodiment.

FIG. 12 is a flowchart for explaining an image providing method according to an embodiment.

Referring to FIG. 12, an image providing method may provide an image by using a display apparatus, the display apparatus including an image generating apparatus, a beam deflector changing the traveling direction of light from the image generating apparatus, and an eye-tracking sensor recognizing the positions of a viewer's eyeballs.

In this case, the image generating apparatus may include an apparatus generating a two-dimensional image, such as an OLED, an LCD, or the like, or an apparatus generating a three-dimensional image such as a holographic display apparatus. In addition, the beam deflector 30 and the eye-tracking sensor 40 of FIG. 1 may be used in the image providing method according to an embodiment. Hereinafter, the image providing method according to an embodiment will be described with reference to the configuration of FIG. 1.

The image providing method according to an embodiment may include operation S101 of sensing a first position of a viewer's right eye RE and left eye LE by using the eye-tracking sensor 40, operation S102 of providing an image generated by using an image generating apparatus to the viewer's right eye RE and left eye LE, operation S103 of sensing a position at which the image is focused, and operation S104 of performing, in real time, mutual calibration of the eye-tracking sensor 40 and the beam deflector 30 based on the first position and the position at which the image is focused.

In operation S101 of sensing the first position of the viewer's right eye RE and left eye LE, the first position, which changes in real time, of the viewer's right eye RE and left eye LE, may be tracked and sensed.

In operation S102 of providing an image to the viewer's right eye RE and left eye LE, the image may be provided toward the sensed first position of the viewer's right eye RE and left eye LE by adjusting the traveling direction of light.

In operation S103 of sensing a position at which an image is focused, the position at which the image is focused may be sensed by using the eye-tracking sensor 40 which may recognize visible light. However, the disclosure is not limited thereto, and in operation S103 of sensing a position at which an image is focused, a position at which an image generated by infrared rays from an infrared light source included in the image generating apparatus is focused may be sensed by using an infrared sensor.

Operation S104 of performing calibration in real time may include operation S121 of adjusting a position at which an image is focused by controlling an operation of the beam deflector 30 so that the image is focused on a second position within a critical distance from the first position of the viewer's right eye RE and left eye LE, and operation S122 of updating a look-up table in real time based on first data related to the first position and second data related to the second position when the image is focused on the second position. Operation S121 of adjusting a position at which an image is focused and operation S122 of updating a look-up table in real time may be performed substantially simultaneously.

After operation S104 of performing calibration in real time, operation S105 of determining whether the look-up table is completed based on the first data related to a plurality of first positions of the viewer's right eye RE and left eye LE and the second data related to the first data may be performed. When the look-up table is not completed based on the first data related to the plurality of first positions of the viewer's right eye RE and left eye LE and the second data related to the first data, operation S101 of sensing the first position of the viewer's right eye RE and left eye LE, operation S102 of providing an image to the viewer's right eye RE and left eye LE, operation S103 of sensing a position at which the image is focused, and operation S104 of performing calibration in real time may be repeatedly performed. When the look-up table is completed based on the first data related to the plurality of first positions of the viewer's right eye RE and left eye LE and the second data related to the first data, the operation of the image providing method may be terminated.

According to various embodiments of the disclosure, a holographic display apparatus, a head-up display apparatus, and an image providing method may be provided According to various embodiments of the disclosure, various types of display apparatuses to which a structure capable of performing, in real time, calibration on an eye-tracking sensor and a beam deflector is applied may be provided.

According to various embodiments of the disclosure, provided are a holographic display apparatus, a head-up display apparatus, and an image providing method, which may provide a more accurate image to a viewer by performing, in real time, calibration of a first position of a viewer's eyeballs recognized by an eye-tracking sensor and a second position at which an image is focused and using a look-up table generated based on a result of the calibration.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A holographic display apparatus comprising:
a backlight unit comprising a light source configured to emit coherent light;
a spatial light modulator configured to diffract incident light from the backlight unit and generate a holographic image;
a beam deflector configured to change a traveling direction of the incident light from the backlight unit to change a focal position of the holographic image;
an eye-tracking sensor configured to recognize positions of a viewer's eyeballs; and
a controller configured to perform, in real time, calibration of the eye-tracking sensor and the beam deflector to focus the holographic image on the recognized positions of the viewer's eyeballs,
wherein the controller is further configured to perform, in real time, mutual calibration of a first coordinate system in which a first position of the viewer's eyeballs is expressed, the first position being recognized by the eye-tracking sensor, and a second coordinate system in which a second position at which the holographic image generated by the spatial light modulator and having a traveling direction changed by the beam deflector is focused is expressed.

2. The holographic display apparatus of claim 1, wherein the first coordinate system comprises a first origin and the second coordinate system comprises a second origin, and
wherein the controller is further configured to control an operation of the beam deflector such that the second origin is positioned within a critical distance from the first origin.

3. The holographic display apparatus of claim 1, wherein the controller is further configured to compare a first position of the viewer's eyeballs, the first position being recognized by the eye-tracking sensor, with a second position at which the holographic image is focused, and control an operation of the beam deflector to change the second position such that a distance between the first position and the second position is less than or equal to a critical distance.

4. The holographic display apparatus of claim 3, wherein the controller comprises a memory in which a look-up table (LUT) formed in advance is stored, the LUT matching first data related to the first position with second data related to the second position.

5. The holographic display apparatus of claim 4, wherein the controller is further configured to update, in real time, the LUT based on the first data related to the first position and the second data related to the second position when the distance between the first position and the second position is less than or equal to the critical distance.

6. The holographic display apparatus of claim 1, wherein the controller is further configured to perform, in real time, calibration of the eye-tracking sensor and the beam deflector based on an image obtained by the eye-tracking sensor.

7. A holographic display apparatus comprising:
a backlight unit comprising a light source configured to emit coherent light
a spatial light modulator configured to diffract incident light from the backlight unit and generate a holographic image;
a beam deflector configured to change a traveling direction of the incident light from the backlight unit to change a focal position of the holographic image;
an eye-tracking sensor configured to recognize positions of a viewer's eyeballs; and
a controller configured to perform, in real time, calibration of the eye-tracking sensor and the beam deflector to focus the holographic image on the recognized positions of the viewer's eyeballs;
an infrared light source configured to emit infrared rays to be incident upon the beam deflector or the spatial light modulator; and
an infrared sensor configured to sense an image generated by the infrared rays emitted from the infrared light source and reproduced by the beam deflector and the spatial light modulator,
wherein the controller is further configured to perform, in real time, calibration of the eye-tracking sensor and the beam deflector based on the image sensed by the infrared sensor
wherein the controller is further configured to calculate position coordinates at which a primary image of the holographic image is focused based on the image obtained by the eye-tracking sensor or the infrared sensor, the primary image being generated by first order diffracted light.

8. The holographic display apparatus of claim 7, wherein the controller is further configured to calculate the position coordinates at which the primary image is focused by using a vision algorithm or a deep learning algorithm.

9. An image providing method using a display apparatus, the display apparatus comprising an image generating apparatus, a beam deflector configured to change a traveling direction of light from the image generating apparatus, and an eye-tracking sensor configured to recognize positions of a viewer's eyeballs, the image providing method comprising:
sensing a first position of the viewer's eyeballs using the eye-tracking sensor;
providing an image generated using the image generating apparatus to the viewer's eyeballs;
sensing a position at which the image is focused; and
performing, in real time, mutual calibration of the eye-tracking sensor and the beam deflector based on the first position and the position at which the image is focused.

10. The image providing method of claim 9, wherein the performing of the mutual calibration in real time comprises adjusting the position at which the image is focused by controlling an operation of the beam deflector such that the image is focused on a second position within a critical distance from the first position.

11. The image providing method of claim 10, wherein the performing of the mutual calibration in real time comprises updating, in real time, a look-up table based on first data related to the first position and second data related to the second position when the image is focused on the second position.

12. The image providing method of claim 9, wherein the sensing of the position at which the image is focused comprises sensing the position at which the image is focused using the eye-tracking sensor.

13. The image providing method of claim 9, wherein the display apparatus further comprises an infrared sensor and the image generating apparatus comprises an infrared light source, and
- wherein the sensing of the position at which the image is focused comprises sensing a position at which an image generated by infrared rays from the infrared light source is focused using the infrared sensor.

14. A head-up display apparatus configured to project an image on a windshield providing an external view to a driver, the head-up display apparatus comprising:
- a display apparatus comprising an image generating apparatus and an eye-tracking sensor configured to recognize the driver's eyeballs;
- an optical system configured to project the image from the display apparatus on the windshield; and
- a beam deflector configured to change a traveling direction of incident light from the image generating apparatus to change a position at which the image is focused,
- wherein the display apparatus further comprises a controller configured to perform, in real time, calibration of the eye-tracking sensor and the beam deflector to focus the image on positions of the driver's eyeballs, the positions being recognized by the eye-tracking sensor,
- wherein the controller is further configured to compare a first position of the driver's eyeballs, the first position recognized by the eye-tracking sensor, with a second position at which the image is focused, and control an operation of the beam deflector to change the second position such that a distance between the first position and the second position is less than or equal to a critical distance, and
- wherein the controller comprises a memory in which a look-up table (LUT) formed in advance is stored, the LUT matching first data related to the first position with second data related to the second position.

15. The head-up display apparatus of claim 14, wherein the image generating apparatus comprises a light source configured to emit coherent light and a spatial light modulator configured to reproduce a holographic image by diffracting incident light from the light source.

16. The head-up display apparatus of claim 15, wherein the optical system comprises at least one optical lens configured to cause light emitted from the light source to be incident on the spatial light modulator.

17. The head-up display apparatus of claim 14, wherein the controller is further configured to update, in real time, the LUT based on the first data related to the first position and the second data related to the second position when the distance between the first position and the second position is less than or equal to the critical distance.

* * * * *